(12) United States Patent
Chantry

(10) Patent No.: US 9,737,953 B2
(45) Date of Patent: Aug. 22, 2017

(54) MANUAL PLASMA SYSTEM WITH REMOTE CONTROL

(71) Applicant: LINCOLN GLOBAL, INC., City of Industry, CA (US)

(72) Inventor: Bruce Chantry, Solon, OH (US)

(73) Assignee: LINCOLN GLOBAL, INC., City of Industry, CA (US)

( * ) Notice: Subject to any disclaimer, the term of this patent is extended or adjusted under 35 U.S.C. 154(b) by 252 days.

(21) Appl. No.: 14/622,349

(22) Filed: Feb. 13, 2015

(65) Prior Publication Data

US 2015/0239060 A1    Aug. 27, 2015

Related U.S. Application Data

(60) Provisional application No. 61/943,724, filed on Feb. 24, 2014.

(51) Int. Cl.

| B23K 10/00 | (2006.01) |
|---|---|
| B23K 9/013 | (2006.01) |
| B23K 9/04 | (2006.01) |
| B23K 9/167 | (2006.01) |
| B23K 9/29 | (2006.01) |
| B23K 9/32 | (2006.01) |

(52) U.S. Cl.
CPC ............ *B23K 10/006* (2013.01); *B23K 9/013* (2013.01); *B23K 9/04* (2013.01); *B23K 9/167* (2013.01); *B23K 9/296* (2013.01); *B23K 9/32* (2013.01); *B23K 10/00* (2013.01)

(58) Field of Classification Search
CPC ...... B23K 10/006; B23K 9/013; B23K 9/167; B23K 9/296; B23K 9/32; B23K 10/00; H05H 1/36; H05H 1/26; H05H 1/42; B23B 9/04
USPC ............ 219/121.39, 121.45, 121.54, 121.57, 219/121.48, 137.31
See application file for complete search history.

(56) References Cited

U.S. PATENT DOCUMENTS

| 4,608,482 A | 8/1986 | Cox et al. |
|---|---|---|
| 2003/0160031 A1 | 8/2003 | Jones et al. |

FOREIGN PATENT DOCUMENTS

| DE | 10 2010 042591 | 4/2012 |
|---|---|---|
| JP | H03 297572 | 12/1991 |

OTHER PUBLICATIONS

International Search Report and Opinion from PCT/IB2015/000217, dated Sep. 9, 2016; 7 pages.

*Primary Examiner* — Mark Paschall
(74) *Attorney, Agent, or Firm* — Perkins Coie, LLP

(57) ABSTRACT

A torch assembly for cutting or spraying applications. The torch assembly includes a torch connector that connects to at least one cable that communicates with a power supply. The torch assembly includes a trigger mounted on the torch assembly to start and stop torch operations. The trigger electrically communicates with the power supply via the at least one cable. The torch assembly also includes a remote switch mounted on the torch assembly to allow an operator to remotely adjust an output of the power supply to a desired output level. The remote switch is electrically coupled to the power supply via the at least one cable.

20 Claims, 4 Drawing Sheets

MANUAL PLASMA SYSTEM WITH REMOTE CONTROL

PRIORITY

The present application claims priority to U.S. Provisional Patent Application No. 61/943,724, which is incorporated herein by reference in its entirety.

TECHNICAL FIELD

Devices, systems, and methods consistent with the invention relate to cutting, and more specifically to devices, systems and methods for manual cutting with a plasma arc torch

BACKGROUND

Current handheld plasma cutting systems use a power supply coupled to a handheld cutting torch that has a trigger mechanism for initiating or stopping the cutting operation. However, this trigger mechanism is simply an "on/off" mechanism and when it is engaged the power supply activates to its set output. In many instances, users of handheld cutting systems "overuse" the system to cut workpieces of a thinner or weaker material than the system is designed for. For example, users would use a 100 amp cutting system to cut thin sheet metal, or thin aluminum but do not bother to reduce the output of the power supply. This usage typically results in very poor quality cuts, as the cutting energy is too high.

Further limitations and disadvantages of conventional, traditional, and proposed approaches will become apparent to one of skill in the art, through comparison of such approaches with embodiments of the present invention as set forth in the remainder of the present application with reference to the drawings.

BRIEF SUMMARY OF THE INVENTION

An exemplary embodiment of the present invention is a handheld plasma cutting system in which a control methodology is implemented on the torch to allow a user to control the output of the cutting power supply from the torch.

An embodiment of the invention is directed to a torch assembly for cutting or spraying applications. The torch assembly includes a torch connector that connects to at least one cable that communicates with a power supply. The torch assembly includes a trigger mounted on the torch assembly to start and stop torch operations. The trigger electrically communicates with the power supply via the at least one cable. The torch assembly also includes a remote switch mounted on the torch assembly to allow an operator to remotely adjust an output of the power supply to a desired output level. The remote switch is electrically coupled to the power supply via the at least one cable. When the trigger is depressed and the remote switch has been operated, the output of the power supply is limited to the desired output level. When the trigger is depressed and the remote switch has not been operated, the output of the power supply is a user-selected nominal output level of the power supply or a maximum output level of the power supply.

In another embodiment, the torch assembly includes a torch connector that connects to at least one cable that communicates with a power supply. The torch assembly also includes a trigger mounted on the torch assembly to start and stop torch operations. The trigger electrically communicates with the power supply via the at least one cable and proportionally adjusts an output of the power supply based on an amount the trigger is depressed. A switch mounted on the torch assembly is mechanically linked to the trigger such that the switch limits the output of the power supply to a desired output level by mechanically limiting a distance the trigger can be depressed. When the trigger is depressed and the switch has been engaged, the output of the power supply is limited to the desired output level. When the trigger is depressed and the switch has not been engaged, the output of the power supply is a user-selected nominal output level of the power supply or a maximum output level of the power supply.

Another embodiment of the invention is directed to a cutting or spraying system. The system includes a power supply having a user interface to set a nominal output level of the power supply. The system also includes a torch assembly with a torch connector that connects to at least one cable that communicates with the power supply. The torch assembly also includes a trigger mounted on the torch assembly to start and stop torch operations. The trigger electrically communicates with the power supply via the at least one cable. A remote switch mounted on the torch assembly allows an operator to remotely adjust an output of the power supply to a desired output level. The remote switch electrically couples to the power supply via the at least one cable. The desired power level is based on a percentage of the nominal output level or a percentage of a maximum output level. When the trigger is depressed and the remote switch has been operated, the output of the power supply is limited to the desired output level. When the trigger is depressed and the remote switch has not been operated, the output of the power supply is the user-selected nominal output level of the power supply or a maximum output level of the power supply

BRIEF DESCRIPTION OF THE DRAWINGS

The above and/or other aspects of the invention will be more apparent by describing in detail exemplary embodiments of the invention with reference to the accompanying drawings, in which.

DETAILED DESCRIPTION

Reference will now be made in detail to various and alternative exemplary embodiments and to the accompanying drawings, with like numerals representing substantially identical structural elements. Each example is provided by way of explanation, and not as a limitation. In fact, it will be apparent to those skilled in the art that modifications and variations can be made without departing from the scope or spirit of the disclosure and claims. For instance, features illustrated or described as part of one embodiment may be used on another embodiment to yield a still further embodiment. Thus, it is intended that the present disclosure includes modifications and variations as come within the scope of the appended claims and their equivalents.

The present disclosure is generally directed to handheld plasma cutting torch useful for various cutting and spraying operation. It is also noted that certain aspects of the present invention could also be implemented on handheld welding torches. It should be noted that for purposes of brevity of clarity, the following discussion will be directed to exemplary embodiments of the present invention which are primarily directed to a plasma torch for cutting. However, embodiments of the present invention are not limited in this regard and embodiments of the present invention can be used in welding and spraying torches without departing from the spirit or scope of the present invention. Various types and sizes of torches are possible at varying voltages if desired. Further, the torches using the disclosed embodiments could be used for marking, cutting or metal removal.

Figure 1:
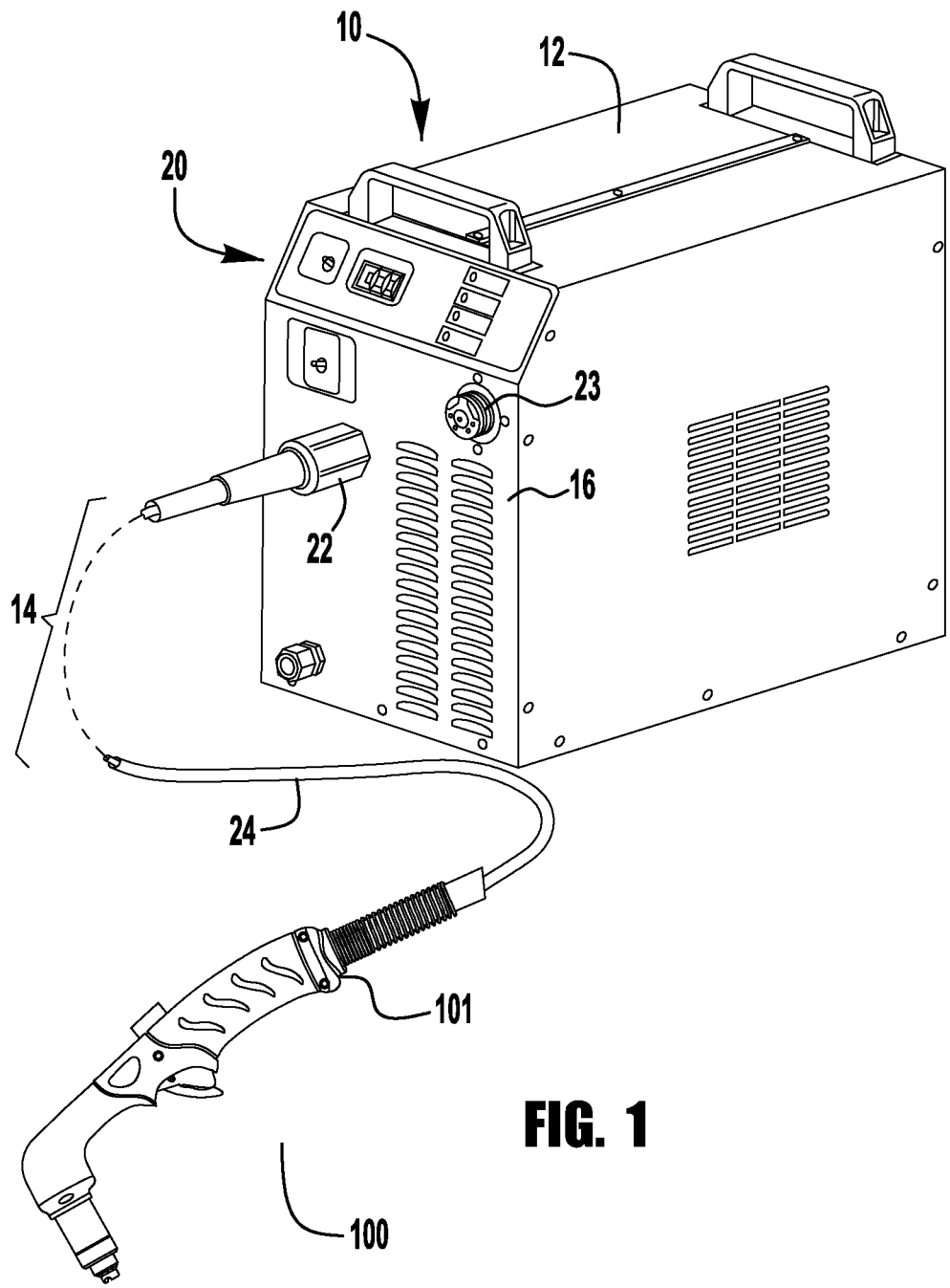
FIG. 1 is a perspective view of one example of a plasma arc torch system according to certain aspects of the disclosure.

FIG. 1 shows one example of such a plasma arc torch system 10. As shown, device 10 includes a housing 12 with a connected torch assembly 100. Housing 12 includes the various conventional components for controlling a plasma arc torch, such as a power supply, a plasma starting circuit, air regulators, fuses, transistors, input and output electrical and gas connectors, controllers and circuit boards, etc. Torch assembly 100 is attached to a front side 16 of housing 12. Torch assembly 100 includes within it electrical connectors to connect an electrode and a nozzle within the torch end to electrical connectors within housing 12. Separate electrical pathways may be provided for a pilot arc and a working arc, with switching elements provided within housing 12. A gas conduit is also present within torch assembly to transfer the gas that becomes the plasma arc to the torch tip, as will be discussed later. Various user input devices 20 such as buttons, switches and/or dials may be provided on housing 12, along with various electrical and gas connectors.

It should be understood that the housing 12 illustrated in FIG. 1 is but a single example of a plasma arc torch device that could employ aspects of the inventive the concepts disclosed herein. Accordingly, the general disclosure and description above should not be considered limiting in any way as to the types or sizes of plasma arc torch devices that could employ the disclosed torch elements.

As shown in FIG. 1, torch assembly 100 includes a connector 22 at one end for attaching to a mating connector 23 of housing 12. When connected in such way, the various electrical and gas passageways through the hose portion 24 of torch assembly 100 are connected so as to place the relevant portions of the torch body in connection with the relevant portions within housing 12.

Additionally, the power supply 10 contains a computer control system (not shown) which controls the operation of the power supply. The construction, use and implementation of a computer control system in a plasma cutting power supply is generally known by those of ordinary skill in the art and will not be discussed in detail herein. As is generally known, the computer control system controls the operation of the power supply in accordance with user inputs via the input devices 20.

Figure 2:
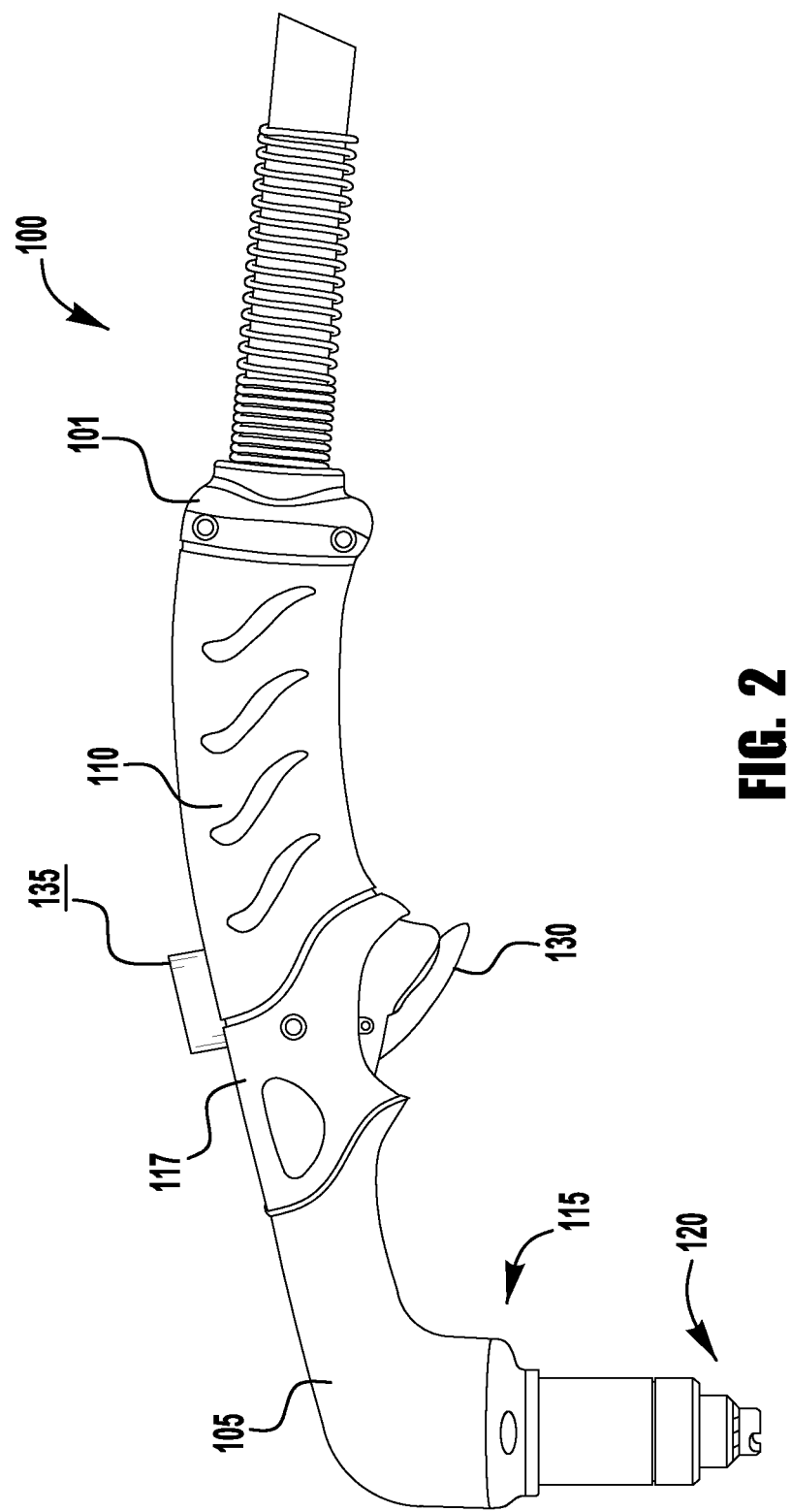
FIG. 2 is a perspective view of a manual cutting torch in accordance with an exemplary embodiment of the present invention.

FIG. 2 depicts an exemplary embodiment of a handheld cutting torch 100 of the present invention. The torch 100 has an assembly which is similar to known handheld plasma cutting torches. The torch 100 comprises a torch connector 101, a handle 110, a torch body 117, a torch head 115 having a shell 105, a torch tip assembly 120, and a trigger 130. The configuration, construction and assembly of the components of the torch 100 can be in accordance with known handheld plasma torches without departing from the spirit or scope of the present invention. Because these aspects of handheld torches are known, the details of which will not be discussed in detail herein.

However, as shown in FIG. 2, embodiments of the present invention also include a remote switch 135 mounted on the torch 100. The switch 135 in FIG. 2 is shown mounted on the top of the torch 100 and is positioned near the junction between the handle 110 and the torch body 117. In this position the switch 135 is positioned to be used by the thumb of an individual handling the torch 100. However, embodiments of the present invention are not limited in this way, and the switch 135 can be mounted at any location on the torch 100, so long as it does not interfere with the cutting operation of the torch 100. The switch 135 is coupled to the power supply 10 with electrical connections via the cable 24 which allow signals to be sent from the switch 135 to the power supply 10 to control the output of the power supply 10. The electrical connection of the switch 135 to the power supply 10 can be similar to that of the trigger 130 to the power supply 10.

Because users often employ plasma cutting power supplies in cutting operations where the available power is well beyond what is needed for a given cutting operation, the switch 135 allows the user to remotely adjust the output power of the power supply 10 for a given cutting operation. That is, if a user intends to cut a thin piece of material, the user can use the switch 135 to adjust the output of the power supply 10 so a that an appropriate power level is utilized. For example, for a given operation a user may determine that the output power of the power supply 10 should only be at a 50% level, and thus the user can use the switch 135 to remotely adjust the output power of the power supply 10 to the level desired for a given cutting operation.

In exemplary embodiments of the present invention, the switch 135 can be a dial which is coupled to a potentiometer (or other similar electrical device) which can adjust the output power of the power supply 10 as desired. When the user turns the dial 135, the power supply 10 adjusts its output power accordingly. In exemplary embodiments, the dial can have discrete setting points (depicted in FIG. 4) where the output power can be adjusted to any one of a number of outputs—for example, 25%, 50%, 75% and 100%. In other exemplary embodiments, the dial 135 can be utilized such that the user can adjust to any % power output between 0 and 100%.

Thus, in exemplary embodiments, the switch 135 can act as a remote power or current input that would also be found in the interface 20 of the power supply 10 such that a user can use the switch 135 to control the output power, just as they would a control on the face of the power supply 10.

In other exemplary embodiments of the present invention, the switch 135 can also be a button type switch 135 which can be used to control the power output. For example, the button switch 135 can be a switch which reduces the power output to a set value so that when the user wants a reduced power output the user depresses the switch 135 at the same time the user depresses the trigger 130 to achieve the desired output. In such an embodiment, if only the trigger 130 is depressed the power output is at 100%, whereas, if the user depresses the button switch 135 and the trigger 130 at the same time, the output power is only at 50% (or any other desired present reduced level). In exemplary embodiments, the user can adjust the present reduced power level via the user interface 20 on the power supply 10 to any desired level. That is, before cutting the user can set the reduced value of the power supply to be at, e.g., 33% of the main cutting power. Thus, when cutting and the switch 135 is depressed power output is reduced from 100% of the power supply setting to the desired reduced value—e.g., 33%.

In other exemplary embodiments, the button switch 135 can be used similar to the dial above, in that the output power of the power supply 10 is adjusted to any one of a number of outputs levels by depressing the button 135 in a predetermined way. For example, the button 135 can adjust the power output by a level of depression of the button—having discrete power output levels for a set depth of depression. That is, if the button is depressed 25% the power output would be at 25% the nominal power output. In other exemplary embodiments, the output level can be adjusted by the number of activations of the button 135. For example, if the button is depressed once prior to cutting, the output power is at 75% of the nominal power, if pressed twice the power output would be at 50%, etc. In some of such embodiments, the torch 100 can also have a small LED or other visual indicator top indicate to the user which power level the torch 100 was set to. For example, the switch 135 itself can have a small LED indicator on it which visually indicates to the user what the current or power level of the power supply is set at.

Figure 3:
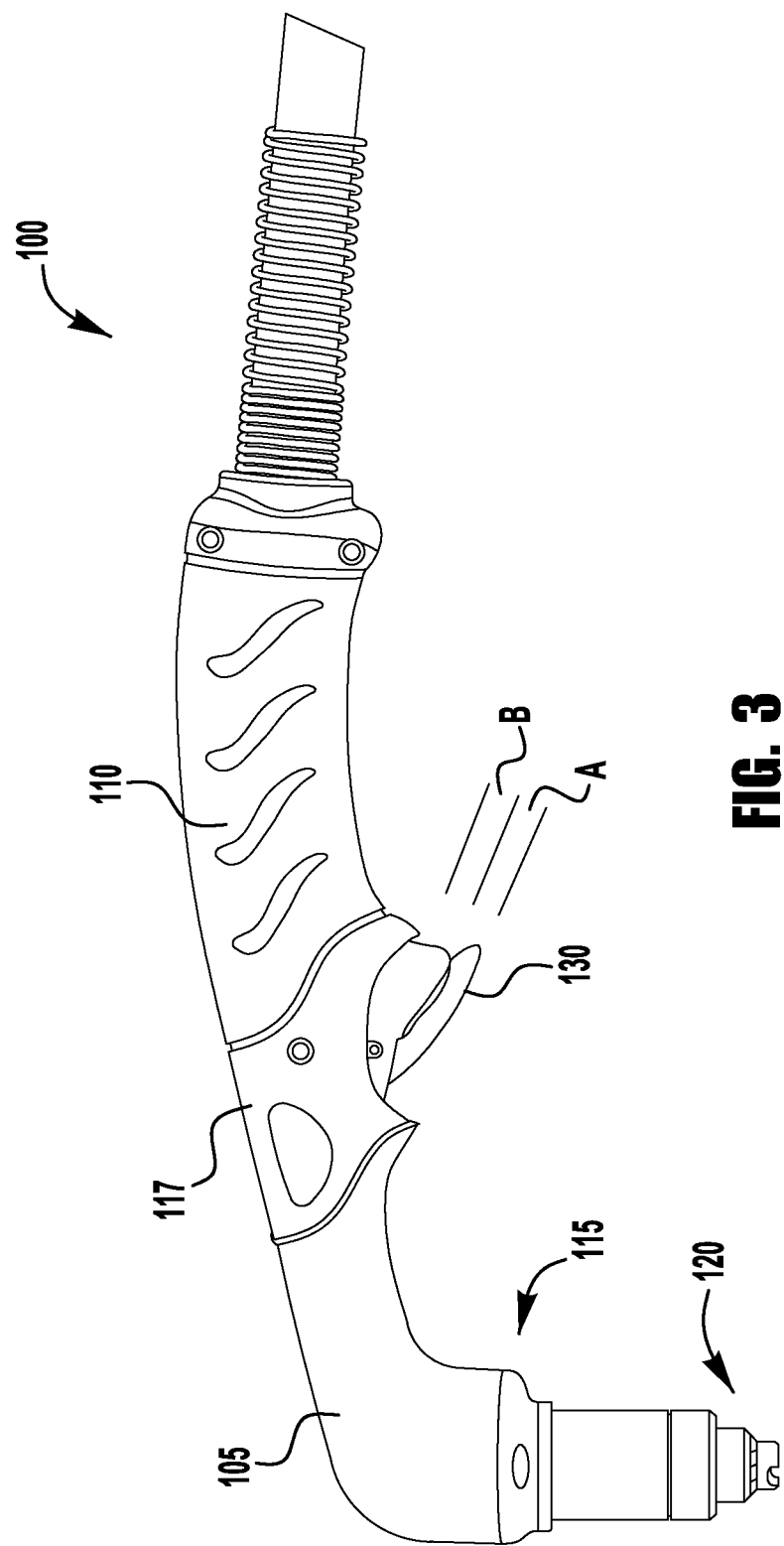
FIG. 3 is a perspective view of another manual cutting torch in accordance with an exemplary embodiment of the present invention.

FIG. 3 depicts another exemplary embodiment of the present invention, where the trigger 130 has a stepped depression sensitivity. That is, when the trigger 130 is depressed for a first distance A the output power is at a first reduced level from the nominal power supply power setting, and if the trigger is a depressed a second distance A+B the output power of the power supply 10 is at a second reduced power level. When the trigger 130 is fully depressed the output power is at 100% of the output power. In such embodiments, the torch 100 can have various mechanical steps or limits to create the steps for the trigger 130. In exemplary embodiments, the steps require an additional depression force to surpass the steps—which allows a user to determine that a step is being reached and surpassed. In the embodiment shown, there are two intermittent steps. However, in other exemplary embodiments there can be only a single step, while in even other embodiments there can be more than two steps (prior to fully engaged). In exemplary embodiments of the present invention, each step can represent a % of the set output power for the power supply 10. For example, if the power supply 10 is set to output 100 amps, the first step A could represent 33 amps (33%), and the second step A+B could represent 66 amps (66%).

In another exemplary embodiment, the switch 135 shown in FIG. 2 can be used as a mechanical limiter for the trigger 130. That is, the trigger 130 can be coupled to a potentiometer (or similar electrical device) and the output power of the power supply 10 can be adjusted based on the distance of the depression of the trigger. In such an embodiment, the switch 135 can be mechanically coupled to the trigger 130 such that the switch 135 can mechanically limit the distance that the trigger is displaced. For example, the switch 135 can be a dial, and when the dial is turned it limits the depression distance of the trigger 130.

Figure 4:
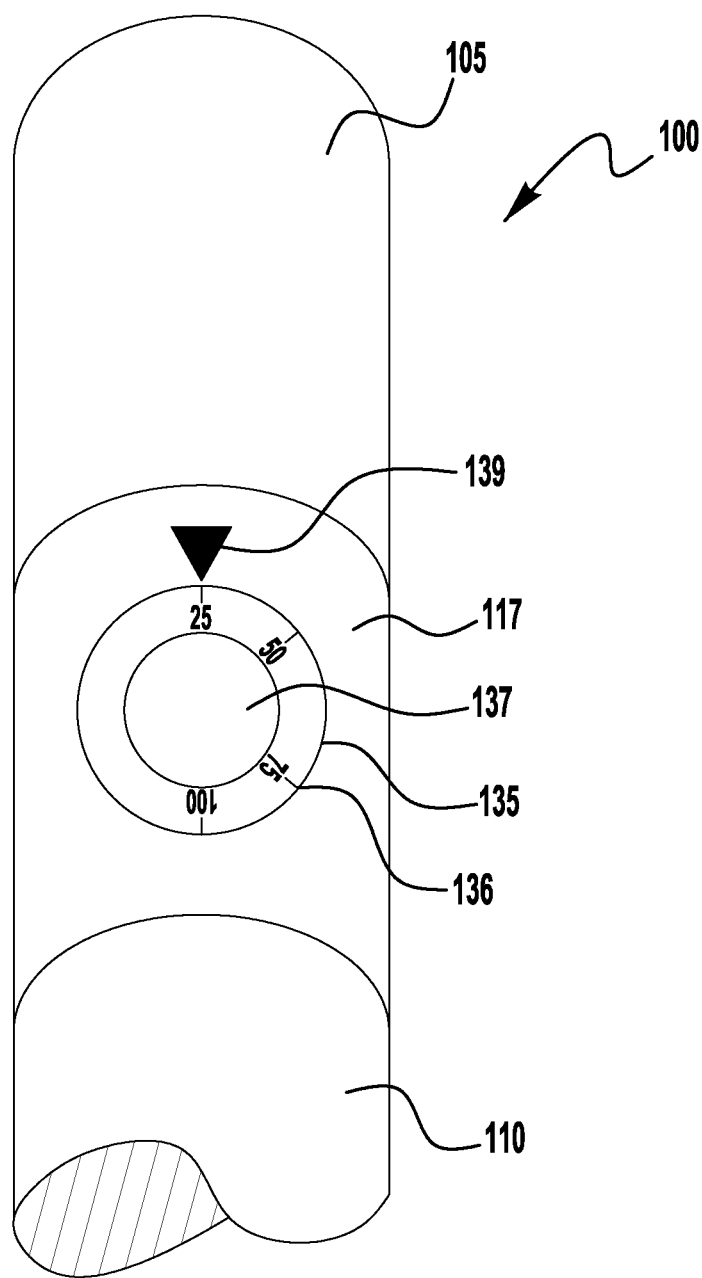
FIG. 4 is a top view of an exemplary switching mechanism of the present invention.

Turning now to FIG. 4, an exemplary switch 135 is shown on the top of the torch 100. In the embodiment shown, the switch 135 has a dial configuration such that there is a position indicator 139 on the torch 100 and the dial includes placarded indicators 136 to allow the user to adjust the power supply 10 output to the desired level. The placarded indicators 136 can either indicate the % of the nominal output power or current of the power supply 10, and/or can be amperage indications. Exemplary embodiments can also have a button switch 137 coupled with the dial switch 135, where the dial is used to adjust the output power level and the button 137 is used to engage this reduction in output power.

In some exemplary embodiments, it may be desirable to disengage the remote control operability of the switch 135 on the torch 100. In such embodiments, the user interface 20 of the power supply can have a switch (not shown) which disables the functionality of the switch 135 such that the output power of the power supply 10 can only be controlled by the user interface 20.

It should be noted that exemplary embodiments of the present can use the remote functionality described above in different ways to control/reduce the output power of the power supply 10. In some embodiments the switch 135 and functionality described above can be used to allow the user to directly control the output current of the power supply 10. That is, in some embodiments the placarding 136 indicates actual amperage levels, up to and including the maximum amperage output of the power supply 10. For example, if the power supply 10 has a maximum cutting current of 100 amps, the switch can allow the user to select 25, 50, or 75 amps, or whatever delineation of amperage that is desired. Whereas, in other exemplary embodiments, the switch 135 and functionality described above can be used where the switch 135 controls the power supply 10 based on a percentage of the set output current on the power supply 10. In these embodiments, the switch settings are representative of a output % and not a current level directly. For example, in such embodiments a user would set an output current or power level on the power supply—e.g., 150 amps. Then, each delineation and/or switch position represents a % of this nominal setting. So if the power supply 10 is set at 150 amps, the exemplary switch positions discussed previously would reduce the output current to a certain, predetermined % of this output current. As an example, the predetermined switch settings could be at 25%, 50%, 75% and 100%. Thus, if a user set the maximum output current for the power supply 10 at 150 amps (via the user interface 20) then each of these respective settings would output 37.5 amps, 75 amps, 112.5 amps and 150 amps. However, if the nominal setting via the user interface 20 was at 100 amps, the settings would provide 25, 50, 75 and 100 amps respectively.

Of course, it should be noted that for some plasma torch systems there is a minimal current level, below which there can be no effective cutting or no plasma can be created. Therefore, in exemplary embodiments of the present invention, the power supply 10 is controlled such that if the switch position results in a current level below this threshold, then no arc would be created. In other exemplary embodiments, the first (or lowest) switch position can be made to correspond to this lowest current output level. For example, if the power supply 10 cannot sustain an effective cutting plasma below a current output of 10 amps, then the first (or lowest) switch position will be set at a level at or slightly above this lowest operable level.

In additional exemplary embodiments, an indicator can be positioned on the torch 100 to provide an indication to the user. For example, an LED type indicator light can be on the torch, which is capable of displaying a plurality of colors, which can provide various indications to the user. The LED/indicator would be controlled by the controller in the power supply 10. For example, in some exemplary embodiments, the indicator can glow red to show that a fault has occurred, can glow green when the power supply is in an idle mode and orange when the power supply is cutting. Further, in other exemplary embodiments, the colors can be used to show the level of cutting current being utilized. For example, a first color can be used when the current output is at a first level, a second color when the current is at a second level, a third color when the output is at a third level, etc. This can add to the level of control that the user has over the cutting process.

In the above exemplary embodiments, operation of the remote switch has been discussed in terms of adjusting and/or limiting the output of the power supply to a desired output level. However, those skilled in the art would readily understand that the remote switch 135 can also be used to regulate the flow and/or pressure of the air/gas (e.g., cooling, shielding, plasma, etc.) used in a cutting or spraying process. For example, in some embodiments, the remote switch 135 can regulate the pressure and/or flow of the air/gas in conjunction with the output of the power supply to provide a desired cut or spray quality. In other embodiments, the air/gas can be regulated independently of the regulation of the power supply, e.g., via a separate remote switch. In some embodiments, the remote switch 135 can be configured to select between adjusting the power supply output, adjusting a control valve for the air/gas, or appropriately adjusting both the power supply output and control valve. When regulating the control valve (or control system) for the air/gas, the features discussed above for regulating the output of the power supply are similarly applicable to adjusting the pressure and/or flow of the air. Accordingly, for brevity, a detailed discussion is omitted, as it is within the knowledge of those skilled in the art to apply the inventive features discussed above with respect to the power supply to a control valve or system that regulates the air/gas used in the cutting or spraying process.

While the subject matter of the present application has been described with reference to certain embodiments, it will be understood by those skilled in the art that various changes may be made and equivalents may be substituted without departing from the scope of the subject matter. In addition, many modifications may be made to adapt a particular situation or material to the teachings of the subject matter without departing from its scope. Therefore, it is intended that the subject matter not be limited to the particular embodiment disclosed, but that the subject matter will include all embodiments falling within the scope of that described herein.

What is claimed is:

1. A torch assembly for cutting and spraying applications, the torch assembly comprising:
   a torch connector that connects to at least one cable that communicates with a power supply;
   a trigger mounted on the torch assembly to start and stop torch operations, the trigger to electrically communicate with the power supply via the at least one cable and proportionally adjusts an output of the power supply based on an amount the trigger is depressed; and
   a switch mounted on the torch assembly and mechanically linked to the trigger, the switch limits the output of the power supply to a desired output level by mechanically limiting a distance the trigger can be depressed,
   wherein, when the trigger is depressed and the switch has been engaged, the output of the power supply is limited to the desired output level, and
   wherein, when the trigger is depressed and the switch has not been engaged, the output of the power supply is a user-selected nominal output level of the power supply or a maximum output level of the power supply.

2. The torch assembly of claim 1, wherein the desired output level is adjustable to select one of a plurality of discrete power levels or current levels to be output from the power supply.

3. The torch assembly of claim 1, wherein the desired output level is adjustable within a range of 0% to 100% of an output level of the power supply.

4. The torch assembly of claim 1, wherein the switch is designed and positioned on the torch assembly such that the switch is operated by an operator's thumb.

5. The torch assembly of claim 1, wherein the desired output level is less than 100% of the user-selected nominal output level of the power supply or the maximum output level of the power supply.

6. The torch assembly of claim 1, wherein the switch is a push-button type switch.

7. The torch assembly of claim 6, wherein the desired output level is adjusted based on a number of times the push button is depressed.

8. The torch assembly of claim 6, wherein the desired output level is adjusted based on an amount the push button is depressed.

9. The torch assembly of claim 1, wherein the switch is a dial-type switch and the desired output level is adjusted by turning a dial on the switch.

10. The torch assembly of claim 9, wherein the dial is placarded and displays at least one of a percent and an actual value relating to the user-selected nominal output level of the power supply or the maximum output level of the power supply.

11. The torch assembly of claim 1, further comprising a visual indicator to display the desired output level.

12. The torch assembly of claim 11, wherein the visual indicator is an LED indicator.

13. A cutting or spraying system, the system comprising:
    a power supply having a user interface to set a nominal output level of the power supply; and
    a torch assembly, the torch assembly comprising:
       a torch connector that connects to at least one cable that communicates with the power supply,
       a trigger mounted on the torch assembly to start and stop torch operations, the trigger to electrically communicate with the power supply via the at least one cable and proportionally adjusts an output of the power supply based on an amount the trigger is depressed, and
       a switch mounted on the torch assembly and mechanically linked to the trigger, the switch limits the output of the power supply to a desired output level by mechanically limiting a distance the trigger can be depressed,
       wherein, when the trigger is depressed and the switch has been engaged, the output of the power supply is limited to the desired output level, and
       wherein, when the trigger is depressed and the switch has not been engaged, the output of the power supply is the user-selected nominal output level of the power supply or a maximum output level of the power supply.

14. The system of claim 13, wherein the desired output level is adjustable to select one of a plurality of discrete output levels relating to an output power or an output current of the power supply.

15. The system of claim 13, wherein the desired output level is adjustable within a range of 0% to 100% of an output power level or an output current level of the power supply.

16. The system of claim 13, wherein the torch assembly further comprises a visual indicator to display the desired output level.

17. The system of claim 13, further comprising:
a control valve for controlling at least one of a pressure and a flow of gas used in a cutting or a spraying process,
wherein the switch regulates the at least one pressure and flow of the gas in conjunction with the output of the power supply to provide a desired cut or spray quality.

18. The system of claim 13, wherein the switch is designed and positioned on the torch assembly such that the switch is operated by an operator's thumb.

19. The system of claim 13, wherein the switch is a push-button type switch.

20. The system of claim 13, wherein the switch is a dial type switch and the desired output level is adjusted by turning a dial on the switch.

* * * * *